No. 647,649. Patented Apr. 17, 1900.
H. S. CHAPMAN.
SPRAYING APPARATUS.
(Application filed Feb. 8, 1900.)

(No Model.)

Witnesses:
E. A. Volk
F. F. Schenzinger

Harrison S. Chapman Inventor
By Wilhelm Bonner
Attorneys.

UNITED STATES PATENT OFFICE.

HARRISON S. CHAPMAN, OF LOCKPORT, NEW YORK.

SPRAYING APPARATUS.

SPECIFICATION forming part of Letters Patent No. 647,649, dated April 17, 1900.

Application filed February 8, 1900. Serial No. 4,477. (No model.)

*To all whom it may concern:*

Be it known that I, HARRISON S. CHAPMAN, a citizen of the United States, and a resident of Lockport, in the county of Niagara and State of New York, have invented a new and useful Improvement in Spraying Apparatus, of which the following is a specification.

This invention relates to the pumps or spraying devices which are employed for spraying trees, plants, and vines with a poisonous liquid to destroy the insects and fungous growths, and which comprises an ordinary force-pump having its suction-pipe connected with a barrel or other receptacle containing the poisonous liquid and a delivery-hose having a spray-nozzle. An apparatus of this kind is shown in Letters Patent of the United States, No. 479,378, granted July 19, 1892, to Adelbert M. Philips.

The suction-pipe of the pump is usually provided at its inlet end with a strainer for intercepting the sediment or undissolved particles of the spraying solution. This strainer is liable to become clogged with sediment, and when this occurs the spraying capacity of the apparatus is reduced.

The object of my invention is to provide the apparatus with a simple cleaning device which automatically keeps the openings of the strainer free from obstructions.

Figure 1:
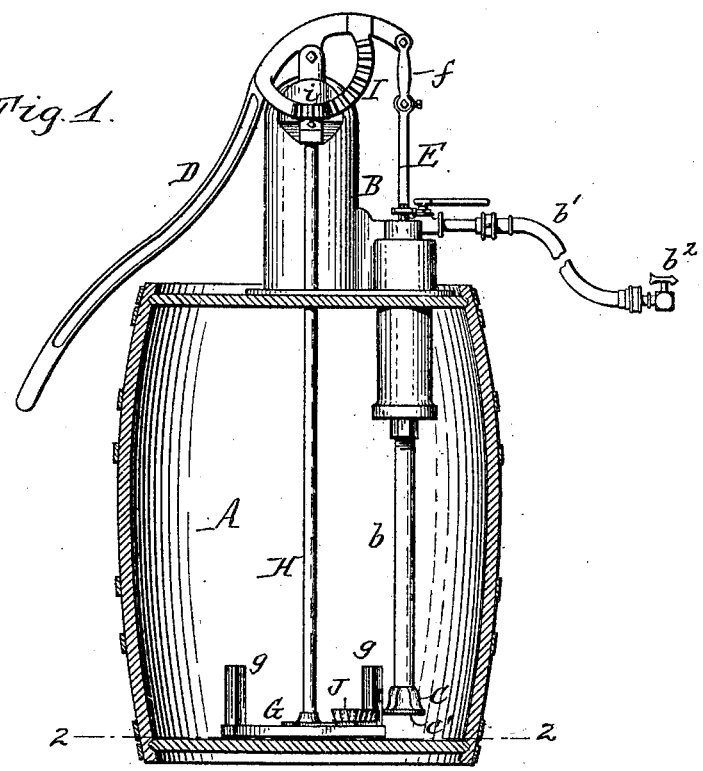
Figure 2:
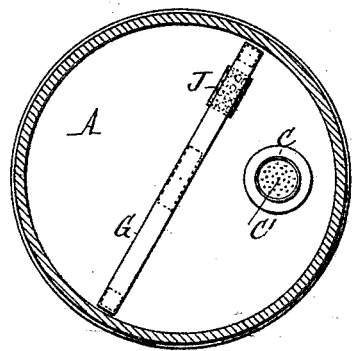

In the accompanying drawings, Figure 1 is a side elevation of my improved spraying apparatus, showing the same attached to a barrel or supply-receptacle, which latter is shown in section. Fig. 2 is a horizontal section in line 2 2, Fig. 1, looking upwardly.

Like letters of reference refer to like parts in both figures.

A is the barrel, adapted to contain the spraying solution.

B is a force-pump of any suitable construction, resting on the barrel; b, the suction-pipe of the pump, extending downwardly into the barrel, and b' the delivery pipe or hose, having the spray-nozzle b².

C is a head or enlargement secured to the lower end of the suction-pipe b, and C' a strainer arranged in said head.

D is a vertically-swinging hand-lever connected with the plunger-rod E of the pump by links f.

G represents oscillating horizontal agitator-arms arranged in the bottom of the supply-receptacle A for stirring the spraying solution and preventing settling of the solid poisonous matter. These agitator-arms terminate in upwardly-projecting paddles or dashers g and are secured to the lower end of a vertical rock-shaft H, which is suitably journaled on the air-chamber or other part of the pump. A rocking or oscillating motion is imparted to this shaft by a gear-segment I, arranged on the hand-lever D and meshing with a pinion i, secured to the upper end of the shaft. The agitator G and its actuating devices form no part of my invention, these improvements being shown and described in the Letters Patent hereinbefore referred to.

J is a wiper or cleaner which is adapted to move across the under side of the strainer C' for removing any adhering sediment therefrom and keeping its perforations open. This cleaner preferably consists of a brush, which is combined with the operating device of the pump B in such manner that the brush is actuated automatically in the act of operating the pump. For this purpose the cleaning-brush is preferably mounted upon the agitator G in such a position that it is swept back and forth over the strainer by the oscillating movements of the agitator. By mounting the brush upon the agitator this desirable cleaning feature is added to the apparatus without requiring a separate actuating-arm or carrier for the brush, thereby avoiding any material increase in the cost of the apparatus.

I claim as my invention—

1. The combination with the pump and its actuating device, of a strainer applied to the suction or inlet pipe of the pump, a movable cleaner arranged to traverse said strainer, and an actuating device for the cleaner which is operated by the actuating device of the pump, substantially as set forth.

2. The combination with the pump and its actuating-lever, of a strainer applied to the suction or inlet pipe of the pump, an oscillating shaft having an arm provided with a cleaner which is arranged to sweep across said strainer, and gearing connecting said shaft with the actuating-lever of the pump, substantially as set forth.

3. The combination with a pump having a depending suction-pipe and a vertically-swinging actuating-lever provided with a gear-segment, of a strainer arranged at the lower end of said suction-pipe, and an upright rock-shaft provided at its upper end with a pinion which meshes with said gear-segment, and at its lower end with a horizontal arm carrying a cleaner which sweeps across said strainer, substantially as set forth.

Witness my hand this 6th day of February, 1900.

HARRISON S. CHAPMAN.

Witnesses:
    EDWARD J. FRITTON,
    LAURA B. CHAPMAN.